United States Patent
Battaglia

Patent Number: 5,941,014
Date of Patent: Aug. 24, 1999

[54] COMPOSITE FISH HOOK AND TACKLE

[76] Inventor: Vincent P. Battaglia, 209 Banks Rd., Easton, Conn. 06612

[21] Appl. No.: 08/992,471

[22] Filed: Dec. 17, 1997

[51] Int. Cl.⁶ .................................................. A01K 83/00
[52] U.S. Cl. ........................ 43/44.82; 43/43.16; 43/42.53
[58] Field of Search .............................. 43/43.16, 44.82, 43/42.53, 44.83

[56] References Cited

U.S. PATENT DOCUMENTS

| | | | |
|---|---|---|---|
| 2,334,613 | 11/1943 | Dunkelberger et al. | |
| 5,265,370 | 11/1993 | Wold | 43/44.82 |
| 5,845,429 | 12/1998 | Battaglia | 43/43.16 |
| 5,875,584 | 3/1999 | Gowing | 43/44.82 |

FOREIGN PATENT DOCUMENTS

| | | | |
|---|---|---|---|
| 726710 | 4/1932 | France | 43/44.82 |

Primary Examiner—Jack W. Lavinder
Attorney, Agent, or Firm—H. Gibner Lehmann; K. Gibner Lehmann

[57] ABSTRACT

A composite fish hook which provides multiple barbs, consists of a main hook part and a dependent hook part that is attached mechanically and physically to the main hook part. The main hook part has a shank portion and a barb portion which latter has twin barbs disposed back to back. The dependent hook part also has a shank, and has either one or two barb portions. If it has two barb portions, these are also disposed back to back. The shank portions of the hook parts are so formed with interfitting sections, that they can be press-fitted together under a camming action which causes temporary distortion of the materials but results in a mechanical junction that is especially rugged and resistant to separation.

18 Claims, 1 Drawing Sheet

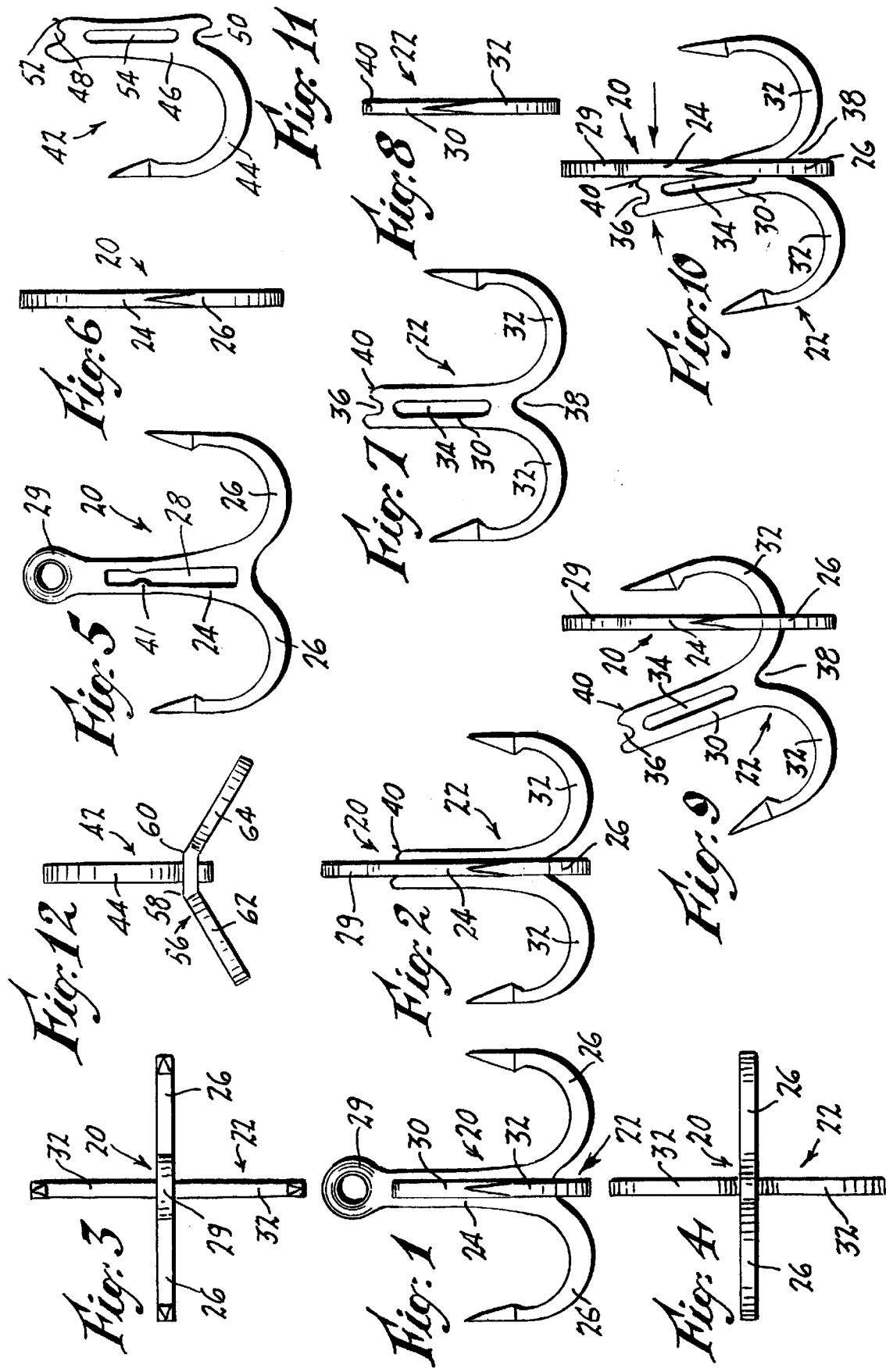

COMPOSITE FISH HOOK AND TACKLE

CROSS REFERENCES TO RELATED APPLICATIONS

1. U.S. application Ser. No. 08/892,452 filed Jul. 14, 1997, entitled SHEET METAL FISH HOOK, having common ownership with this application.

2. U.S. application Ser. No. 08/938,566 filed Sep. 26, 1997, entitled LAYERED SHEET METAL FISH HOOK, having common ownership with this application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

FIELD OF THE INVENTION

This invention relates generally to fishing tackle, and more particularly to metal fish hooks, particularly those that are constituted of a number of components which are mechanically or physically secured together.

DESCRIPTION OF THE RELATED ART INCLUDING INFORMATION DISCLOSED UNDER 37 CFR §§1.97–1.99

U.S. Pat. No. 2,334,613 dated Nov. 16, 1943 shows a composite metal fish hook wherein a main hook part 10 has apertures 14 and 16 which receive tongues 42 and 44 respectively of a dependent hook part 46, which latter is curved initially. The tongues 42 and 44 are fitted into the apertures 14 and 16, after which a tool flattens the curved portion 46. This spreads apart the tongues 42 and 46, causing them to clinch the shank of the hook part 10. This is different from any swaging or mushrooming of the tongues 42, 44 solidly against the shank of the hook part, in the manner of a rivet for example. It is noted that, due to a possible camming apart of the tongues, the hook parts in this patent could obviously be forced apart without destructive action of the shanks. The tongues 42 and 44 do not have any shoulder formations that would forestall such camming or release action; they have only smooth, sloped surfaces which are relied on to hold the hook parts in assembled relation.

U.S. Pat. No. 2,523,833 shows a composite fish hook with multiple barb portions which have shanks that are clinched under clamping ribs 30 punched out from a sheet metal clamping plate 28. The disclosure embraces a triple-barb fish hook, wherein a total of four individual components are utilized. Where a number of components are involved, the complexity and costs of a product tend to creep up.

SUMMARY

The disadvantages and drawbacks of the above prior fish hooks are obviated by the present invention, and one object of the invention is to provide an improved multiple-barb composite fish hook which is of the utmost simplicity yet readily capable of manufacture in triple and quadruple barb versions.

Another object of the invention is to provide an improved composite fish hook as above characterized, which is especially low in cost, to produce.

A further object of the invention is to provide an improved composite fish hook as above set forth, which is strong and durable when placed in use.

Yet another object of the invention is to provide an improved fish hook in accordance with the foregoing, which is so constructed that the various components thereof are easily fabricated and assembled.

A still further object of the invention is to provide an improved fish hook as outlined above, which has a low tooling cost.

A feature of the invention is the provision of improved composite fish hooks of the kind referred to, where labor and assembly costs can be low and largely automated.

Another feature of the invention is the provision of improved fish hooks as described above, which are especially effective for the purposes desired.

The fish hooks of this invention are adaptable for various and diverse uses, and have other features and advantages which will be hereinafter brought out.

In accomplishing the above objects, the invention provides a unique composite fish hook consisting of a main hook part and a dependent hook part which latter is attached by novel means to the main hook part. The main hook part has a shank portion and a barb portion, the latter being comprised of twin barbs which are integral with the shank portion, and the dependent hook part has a shank portion and also a barb portion which latter can have either a single barb or else twin barbs that are preferably disposed back to back. In connection with these hook parts there are unique, cooperable interlocking means on the shank portions of the hook parts, such means joining the shank portions securely together and enabling the twin barbs of the main hook part to be disposed back to back or else in angularly related positions. The interlocking means utilizes a camming action in the assembly operation of the parts, together with a controlled stretching and compressing of the shank portions and a positive interfitting of shouldered sections of the parts.

Other features will become apparent in connection with the following description.

BRIEF DESCRIPTION OF THE DRAWINGS

In the accompanying drawings, illustrating several embodiments of the invention:

FIG. 1 is a front elevational view of the assembled fish hook of the invention.

FIG. 2 is a side elevational view of the fish hook shown in FIG. 1.

FIG. 3 is a top plan view of the fish hook of FIGS. 1 and 2.

FIG. 4 is a bottom plan view of the fish hook of FIGS. 1 and 2.

FIG. 5 is a side elevational view of the main hook part of the fish hook of the invention.

FIG. 6 is a side edge elevational view of the main hook part shown in FIG. 5.

FIG. 7 is a side elevational view of the twin-barb dependent hook part of the fish hook of the invention.

FIG. 8 is a side edge elevational view of the dependent hook part of FIG. 7.

FIG. 9 is an elevational view of the hook parts showing an initial step in the assembly of the same.

FIG. 10 is a view like that of FIG. 9 but showing a further step in the assembly of the hook parts, wherein a camming surface of the dependent hook part starts to engage the shank portion of the main hook part.

FIG. 11 is a side elevational view of a single-barb dependent hook part which is utilized in the forming of a triple-barb hook, and FIG. 12 is a bottom plan view of a triple-barb fish hook, utilizing the dependent hook part of FIG. 11.

DETAILED DESCRIPTION OF THE PREFERRED EMBODIMENTS

Referring first to FIGS. 1–8, the present improved fish hook comprises a novel metallic composite consisting of a main hook part 20 and an adjunct or dependent hook part 22, both of which are press-fitted together with considerable force to stretch and also compress the metals with the result that there is formed a very strong yet economical-to-fabricate multiple-barb fish-hook, as shown assembled in FIGS. 1–4. The main hook part 20 has a shank portion 24 and twin barb portions 26 which are integral with the shank portion thereof. Also, the shank portion 24 of the main hook part has an elongate aperture 28 which is slightly wider at its bottom and which extends length-wise of the shank portion as seen in FIG. 5. The shank portion 24 has an eye configuration 29 at its top.

The dependent hook part 22 has a shank portion 30 and twin barb portions 32 which are integral with the shank portion 30, as seen in FIG. 7, and has an elongate aperture 34 which extends lengthwise thereof substantially for the full length of the shank portion 30.

Referring to the assembly of FIGS. 1–4, the shank portions 24 and 30 of the hook parts are interlocked with each other and generally coextensive, as shown. This is also depicted in the assembly steps of the hook parts as illustrated in FIGS. 9 and 10.

As shown and in accordance with the present invention, the shank portion 30 of the hook part 22 also has an elongate aperture 34 that extends lengthwise thereof. At its ends, the shank portion 30 of the hook part 22 has notches 36 and 38 formed by adjoining shoulders, which serve to lock the hook parts 20 and 22 together once they are assembled. Referring particularly to FIG. 9, one shoulder at the notch 36 of the shank portion 30 is provided with a camming edge 40 to facilitate insertion of the top end of the shank 30 in the aperture 28 of the hook part 20.

FIGS. 9 and 10 show two assembly steps in explaining how the shank portion 30 of the hook part 22 is brought into and through the aperture 28 of the main hook part 20. First, a barb portion 32 of the hook part 22 is passed through the aperture 28 of the main hook part 20 as seen in FIG. 9, this being facilitated by the greater width of the bottom portion of the aperture. Then the shank portion 30 of the hook part 22 is moved toward the shank portion 24 of the main hook part 20 as seen in FIG. 10. So as to bring the camming edge 40 into engagement with the upper end of the shank portion 24.

Thereafter, a powerful force, such as that provided by a power press, can be used to exert pressures indicated by the opposing arrows in FIG. 10, to cam and force the upper end of the shank portion 30 (having the notch 36) fully into the aperture 28. In consequence of this, end regions of the shank portion 30 of the dependent hook part 22 will be forcefully fitted into the aperture 28 of the main hook part 20, and the hook parts 20 and 22 will then be held captive in the notches 36 and 38.

The aperture 34 of the shank portion 30 reduces the active cross section thereof, and a very slight amount of temporary longitudinal compression or bending of the shank portion 30 can occur, together with a slight amount of temporary longitudinal stretching of the shank portion 24 of the hook part 20 during this forceful interfitting of the shank portions. In the assembled hook, some of this compression and stretching remains, thereby making for a very secure joint between these two shank portions.

In accordance with the invention and as seen in FIGS. 5–8, the hook parts 20 and 22 have tapering or stronger cross sections at the lower ends of the shank portions thereof, and also at the barb portions thereof, for the purpose of distributing the various stresses and assigning more stock where it is needed to avoid bending or breakage. Also, where stretching is considered desirable, or compressive stress is to be utilized, the shapes shown can be modified to meet the desired conditions.

Further, as seen in FIG. 5, a pair of nibs 41 can be formed on opposite sides of the aperture 28 in the hook part 20 to interact with the edges of the aperture 34 of the dependent hook part 22, thereby to further strengthen the assemblage of hook parts shown in FIGS. 1–4.

Another embodiment of the invention is illustrated in FIGS. 11 and 12, providing a triple-barb fish hook having the same strength and economy as found in the quadruple-barb hook above explained. FIG. 11 shows a single-barb hook part 42 having a barb portion 44 which is integral with a shank portion 46 that has end notches 48 and 50, a camming edge 52 and an elongate aperture 54. FIG. 12 shows the hook part 42 assembled to a twin-barb main hook part 56 which is generally similar to the hook part 20 except that the shank portion has bends 58 and 60 so as to dispose the barb portions 62 and 64 at an angle with respect to each other. The assembly of the hook part 42 to the hook part 56 can now be understood, being in part similar to that already described above in connection with the quadruple-barb hook. The lower end of the shank 46, having the notch 50, is first placed in the aperture of the hook part 42 and then the cam 52 is applied to the upper portion of the hook part 42 in the same manner as that illustrated in FIG. 10.

As shown in FIGS. 1 and 5, the eye 29 of the main hook part 20 does not have sharp edges which might cause fraying of any fish line that is tied to it. Instead, the eye has been coined on its interior and exterior, so as to round off the inner and outer edges whereby it approaches the configuration of a doughnut.

It will now be seen from the foregoing that I have provided an improved fishing tackle and composite multiple-barb fish hook which is both extremely simple yet durable and rugged in its construction while at the same time being economical of manufacture. The fish hook is capable of being readily produced in triple and quadruple configurations, has a low tooling and labor cost, and is effective in various and diverse applications.

Variations and modifications of the above structures are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LISTING OF REFERENCE NUMERALS

20. Main hook part
22. Dependent hook part
24. Shank portion of main hook part
26. Twin barb portions of main hook part
28. Elongate aperture of main hook part
29. Eye portion of main hook part 30. Shank portion of dependent hook part
32. Twin barb portions of dependent hook part
34. Elongate aperture of dependent hook part
36. Notch of shank portion 30
38. Notch of shank portion 30
40. Camming edge of shank portion 30
42. Single-barb hook part
44. Barb portion of single-barb hook part
46. Shank portion of single-barb hook part
48. End notch of single-barb hook part
50. End notch of single-barb hook part
52. Camming edge of single-barb hook part
54. Elongate aperture of single-barb hook part
56. Twin-barb main hook part
58. Bend in shank portion of twin-barb main hook part
60. Bend in shank portion of twin-barb main hook part
62. Barb portion of twin-barb main hook part
64. Barb portion of twin-barb main hook part

What is claimed is:

1. A composite fish hook providing multiple barbs, comprising, in combination:
    a) a main hook part and a dependent hook part which is attached to said main hook part,
    b) said main hook part having a shank portion and a barb portion comprised of twin barbs which are integral with the shank portion,
    c) said dependent hook part having a shank portion and a barb portion comprised of twin barbs and which is integral with the shank portion thereof, and
    d) cooperable interlocking means on the shank portions of said hook parts,
    e) said interlocking means joining the said shank portions together and enabling the twin barbs of each hook part to be disposed back-to-back and to extend in parallel directions.

2. A composite fish hook as set forth in claim 1, wherein the eye is constituted as a coined or swaged loop that is substantially completely devoid of sharp edges.

3. A composite fish hook as set forth in claim 1, wherein:
    a) said interlocking means comprises an elongate aperture in one of said shank portions, extending lengthwise thereof,
    b) said aperture having a length which is commensurate with the length of the other of said shank portions,
    c) said other shank portion having a press-fit in the said aperture.

4. A fish hook as set forth in claim 3, wherein said elongate aperture has a nib protruding into it, providing for a press fit engagement with the said dependent hook part.

5. A composite fish hook as set forth in claim 1, wherein the shank portion of the main hook part has means providing an eye for the attachment of a fishing line.

6. A composite fish hook as set forth in claim 3, wherein the said other shank portion has shoulder means at its extremities, engageable with edge sections of the aperture to lock the other shank portion to said one shank portion.

7. A composite fish hook as set forth in claim 6, wherein one of said shoulder means has a camming edge to enable the said other shank portion to be cammingly wedged into the said aperture.

8. A composite fish hook as set forth in claim 3, wherein the respective shank and barb portions have merging areas which are of greater expanse than the remaining areas of the shank and barb portions, thereby to provide greater strength at said merging areas.

9. A composite fish hook providing multiple barbs, comprising, in combination:
    a) a main hook part and a dependent hook part which is attached to said main hook part,
    b) said main hook part having a shank portion and a barb portion which is integral with the shank portion thereof,
    c) said shank portion of the main hook part having an elongate aperture which extends lengthwise thereof,
    d) said dependent hook part having a shank portion and a barb portion which is integral with the shank portion thereof,
    e) said shank portions of the hook parts being interlocked with each other whereby they are partially coextensive,
    f) said shank portion of the dependent hook part extending into and through the aperture of the main hook part and at its ends having notches into which the shank portion of the main hook part, at the ends of the aperture thereof, fits.

10. A composite fish hook as set forth in claim 9, wherein:
    a) the main and the dependent parts of the fish hook are of metal,
    b) one of said shank portions being under continual tensile stress and the other of said shank portions being under continual compressive stress.

11. A composite fish hook as set forth in claim 9, wherein the main hook part has an additional barb portion whereby the fish hook has a total of three barb portions.

12. A composite fish hook as set forth in claim 9, wherein each of the hook parts has an additional barb portion whereby the fish hook has a total of four barb portions.

13. A composite fish hook as set forth in claim 9, wherein one of said shank portions has means providing an eye for the attachment of a fish line thereto.

14. A composite fish hook as set forth in claim 13, wherein the means providing the eye is on the main hook part.

15. A composite fish hook as set forth in claim 9, wherein the width of the said aperture is commensurate with the thickness of the dependent hook part.

16. A composite fish hook as set forth in claim 10, wherein the shank portion of the dependent hook part has an elongate aperture which extends lengthwise thereof.

17. A fish hook comprising, in combination:
    a) a main part and a dependent hook part which is attached to said main part,
    b) said main part having an elongate aperture in it,
    c) said dependent hook part having an elongate shank portion and a barb portion which is integral with the shank portion,
    d) cooperable interlocking means on said main part and said shank portion,
    e) said interlocking means joining the said main part and said shank portion together,
    f) said shank portion of the hook part having notches at its ends respectively, and
    g) said shank portion having a cam means adjacent one of the notches thereof, for enabling the said shank portion to be cammed into said elongate aperture after the other of said notches of the shank portion has first been placed in said elongate aperture at one end thereof.

18. The method of assembling a composite fish hook having a main hook part and a dependent hook part wherein the main hook part has an elongate aperture in it and wherein the dependent hook part has a shank portion with notches respectively at the ends of the shank portion, which method consists of the steps of inserting one of the notched ends of the shank portion of the dependent hook part into the elongate aperture of the main hook part at one end thereof, and thereafter swinging the shank portion of the dependent hook part to force the remainder thereof fully into the elongate aperture of the main hook part so as to engage the main hook part in the notch of the other of said notched ends of the shank portion of the dependent hook part.

* * * * *